US011869198B2

(12) United States Patent
Lim et al.

(10) Patent No.: US 11,869,198 B2
(45) Date of Patent: Jan. 9, 2024

(54) METHOD FOR IDENTIFYING STILL OBJECTS FROM VIDEO

(71) Applicants: Jong Heon Lim, Seoul (KR); Hyun Woo Lee, Seoul (KR); Seung Hoon Jung, Seoul (KR); Sungjin Lee, Gwangmyeong-si (KR)

(72) Inventors: Jong Heon Lim, Seoul (KR); Hyun Woo Lee, Seoul (KR); Seung Hoon Jung, Seoul (KR); Sungjin Lee, Gwangmyeong-si (KR)

(73) Assignee: INNODEP CO., LTD., Seoul (KR)

( * ) Notice: Subject to any disclaimer, the term of this patent is extended or adjusted under 35 U.S.C. 154(b) by 147 days.

(21) Appl. No.: 17/379,425

(22) Filed: Jul. 19, 2021

(65) Prior Publication Data
US 2022/0189037 A1 Jun. 16, 2022

(30) Foreign Application Priority Data
Jul. 22, 2020 (KR) .................. 10-2020-0090683

(51) Int. Cl.
*G06K 9/00* (2022.01)
*G06T 7/20* (2017.01)
*H04N 7/18* (2006.01)

(52) U.S. Cl.
CPC ............. *G06T 7/20* (2013.01); *H04N 7/18* (2013.01); *G06T 2207/10016* (2013.01); *G06T 2207/20084* (2013.01); *G06T 2207/30232* (2013.01)

(58) Field of Classification Search
CPC ............ G06T 7/20; G06T 2207/10016; G06T 2207/20084; G06T 2207/30232;

(Continued)

(56) References Cited

U.S. PATENT DOCUMENTS 11,455,793 B2 * 9/2022 Campos Macias .. G06V 10/764
2007/0122000 A1 * 5/2007 Venetianer ............ G06V 20/52
382/103

(Continued)

FOREIGN PATENT DOCUMENTS

KR 10-1942808 B 1/2019

OTHER PUBLICATIONS

H. Ji, Z. Gao, T. Mei and Y. Li, "Improved Faster R-CNN With Multiscale Feature Fusion and Homography Augmentation for Vehicle Detection in Remote Sensing Images," in IEEE Geoscience and Remote Sensing Letters, vol. 16, No. 11, pp. 1761-1765, Nov. 2019 (Year: 2019).*

*Primary Examiner* — Alex Kok S Liew
(74) *Attorney, Agent, or Firm* — John K. Park; PARK LAW FIRM (57) ABSTRACT

The present invention generally relates to a technology of detecting a stationary object in a static video, i.e., a video which is generated by a camera with a fixed view, such as a CCTV video. More specifically, the present invention relates to a technology of identifying a stationary object by use of inference information (Tensor, Activation Map) of Deep Learning object detector among objects which have been detected in a static video such as a CCTV video. According to the present invention, it is possible to lower the priority of stationary objects (e.g., parked vehicles) in processing a static video so that computing resource of the video analysis system can be effectively utilized in the process after object detection so as to enhance the performance of image analysis.

5 Claims, 11 Drawing Sheets

(58) Field of Classification Search
CPC . G06T 2207/20081; G06T 7/254; H04N 7/18;
H04N 7/183; G06N 3/08; G06N 5/04;
G06N 3/045; G06N 20/00; G06N 3/04;
G06N 3/02; G06N 3/048; G06N 3/084;
G06N 3/082; G06N 3/044; G06N 20/10;
G06V 10/82; G06V 10/764; G06V 20/10;
G06V 10/25; G06V 10/454; G06V 20/52;
G06V 20/58; G06V 20/00; G06V 20/56;
G06V 20/20; G06V 20/64; G06V 20/41;
G06V 20/176; G06V 20/46; G06V 10/10;
G06V 20/44; G06V 40/20; G06V 10/255;
G06V 10/44; G06V 20/30; G06V 10/761;
G06V 10/803; G06V 20/40; G06V
2201/07; G06V 10/32; G06V 10/7753;
G06V 20/582
See application file for complete search history.

(56) References Cited

U.S. PATENT DOCUMENTS

| | | | | |
|---|---|---|---|---|
| 2015/0279182 A1* | 10/2015 | Kanaujia | ......... | G08B 13/19608 382/103 |
| 2018/0268292 A1* | 9/2018 | Choi | ................... | G06V 10/454 |
| 2021/0227126 A1* | 7/2021 | Se | ......................... | G06N 3/045 |
| 2022/0230442 A1* | 7/2022 | Sulzer | ................... | G06V 20/52 |

* cited by examiner

```
__global__ void stationary_op_avg_add_type2_kernel(unsigned int size, float* x, float* y, float* buffer,
                                                    unsigned int buffer_count)
{
    unsigned int idx = (blockIdx.x + blockIdx.y * gridDim.x) * blockDim.x + threadIdx.x;

if (idx < size)
    {
        if (x[idx] > 0.25f) x[idx] = 1;
        else x[idx] = 0;

y[idx] = y[idx] + x[idx] * (1.0f / buffer_count);
    }
}
```

FIG. 8 scale branch 1
Stationary tensor
13x13x81 scale branch 2
Stationary tensor
26x26x81 scale branch 3
Stationary tensor
52x52x81

FIG. 9

```
void AnchorDecoder::forward_stationary(shared_ptr<Tensor> head, shared_ptr<Tensor> stationary,
                                        int head_index, int origin_height, int origin_width)
{
    float ratio_x = ((float)input_width / (float)head->w()) * ((float)origin_width / (float)input_width);
    float ratio_y = ((float)input_height / (float)head->h()) * ((float)origin_height / (float)input_height);
    int stride = head->w() * head->h();

for (int b = 0; b < head->n(); b++)
    {
        for (int y = 0; y < head->h(); y++)
        {
            for (int x = 0; x < head->w(); x++)
            {
                for (int a = 0; a < anchor_count; a++)
                {
                    int ch_index = a * (classes + 5);
                    int anchor_index = (head_index * 2 * anchor_count) + 2 * a;
                    int objectness_index = get_index_nchw(b, ch_index + 4, y, x, head);

if (head->data()[objectness_index] > object_confidence)
                    {
                        int bx_index = get_index_nchw(b, ch_index + 0, y, x, head);
                        int by_index = bx_index + stride;
                        int bw_index = by_index + stride;
                        int bh_index = bw_index + stride;
                        grid_pool_object grid = spawn_grid();

// Objectness
                        grid->objectness = head->data()[objectness_index];

// Bounding Box
                        float bx, by, bw, bh;
                        bx = (x + head->data()[bx_index]) / head->w();
                        by = (y + head->data()[by_index]) / head->h();
                        bw = exp(head->data()[bw_index]) * anchor[anchor_index] / input_width;
                        bh = exp(head->data()[bh_index]) * anchor[anchor_index + 1] / input_height;
                        grid->xmin = (bx - bw / 2) * origin_width;
                        grid->ymin = (by - bh / 2) * origin_height;
                        grid->xmax = (bx + bw / 2) * origin_width;
                        grid->ymax = (by + bh / 2) * origin_height;

for (int i = 0; i < classes; i++)
                        {
                            int class_index = get_index_nchw(b, ch_index + 5 + i, y, x, head);

// Set Class Score
                            grid->scores[i] = grid->objectness * head->data()[class_index];
                            grid->scores[i] = (grid->scores[i] > class_confidence[i]) ? Grid->scores[i] : 0;

// Set Stationary Score
                            grid->stop_scores[i] = stationary->data()[objectness_index] *
                                                   stationary->data()[class_index];
                        }
                        grid_list.push_back(grid);
                    }
                }
            }
        }
    }
}
```

FIG. 10

(a) Input Video (CCTV)

(b) Overall Object Detection (c) Input Video + Tns_Avg (d) Stationary Object Detection

*FIG. 11*

(a) Visualization of Tensors (13x13, 26x26)

(b) Input Video + Tns_Avg(13x13) + Tns_Avg(26x26)

METHOD FOR IDENTIFYING STILL OBJECTS FROM VIDEO

BACKGROUND OF THE INVENTION

The present invention generally relates to a technology of detecting a stationary object in a static video, i.e., a video which is generated by a camera with a fixed view, such as a CCTV video.

More specifically, the present invention relates to a technology of identifying a stationary object by use of inference information (Tensor, Activation Map) of Deep Learning object detector among objects which have been detected in a static video such as a CCTV video.

In recent years, it is common to establish a CCTV-based video surveillance system for the purpose of crime prevention as well as proof of criminal evidence. With a number of CCTV cameras installed in each region, the video of CCTV cameras are displayed on monitors and are stored in storage devices. When a security staff finds a scene where a crime or an accident occurs, he may immediately respond appropriately, and if necessary, he may search the video in the storage devices to secure criminal evidence.

However, the number of staff members is not enough considering the CCTV cameras. In order to effectively perform video surveillance with such a limited number of staffs, it is not enough to simply display CCTV video on monitor screens. It is desirable to detect motion of objects in each CCTV video and further display something in the corresponding area in real time so that the motion may be effectively discovered. In this case, the security staff does not observe the entire CCTV video with a uniform degree of interest, but only monitors the CCTV video with focusing on the part where the motion of object is detected.

Figure 1:
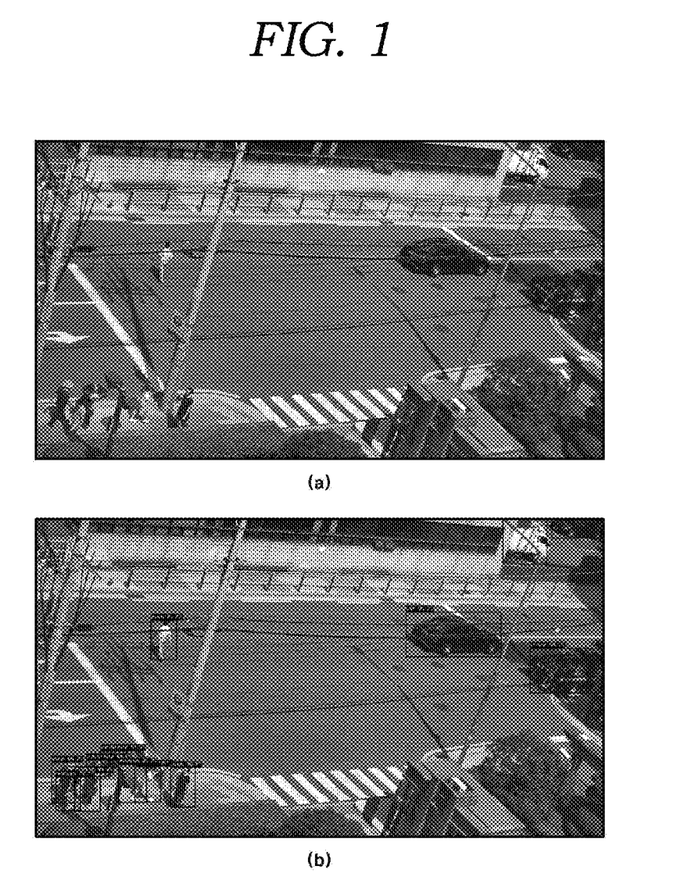
FIG. 1 is a diagram showing an example of a general CCTV video and an object detection result of the conventional art.

FIG. 1 is a diagram showing an example of a general CCTV video and an object detection result for the CCTV video. As shown in FIG. 1, if the object detection result is overlaid on the CCTV video, a small number of security staffs can monitor a plurality of CCTV monitoring screens and the efficiency of the post search can be improved.

Figure 2:
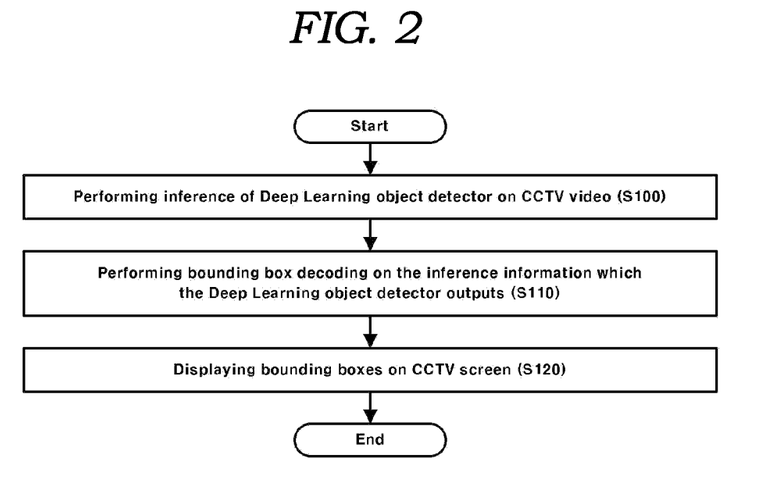
FIG. 2 is a flow chart showing an object detection process based on Deep Learning object detector in the conventional art.

FIG. 2 is a flow chart showing an object detection process based on Deep Learning object detector in the conventional art. An object detection technology shall be briefly described with reference to FIG. 2.

Step (S100): First, inference of a Deep Learning object detector is performed on a CCTV video, in which the Deep Learning object detector is trained based on a convolutional neural network (CNN). Meanwhile, because the object detector based on deep learning and convolutional neural networks is a widely known technology, detailed descriptions thereof is omitted in this specification. For example, "Deep Learning for Generic Object Detection: A Survey" (index number arXiv:1809.02165v4 [cs.CV] 22 Aug. 2019) can be referred. Further, "Object Detection with Deep Learning: A Review" (index number arXiv:1807.05511v2 [cs.CV] 16 Apr. 2019) can be referred.

Step (S110): Bounding box decoding is performed on the inference information which the Deep Learning object detector outputs. In the field of image analysis, a bounding box represents an object. Therefore, generating bounding box information corresponds to detection of an object in a CCTV video. In the present invention, the inference information may include Tensor, Feature Map, or Activation Map, and so on. The Feature Map or Activation Map is the output of a filter, where the filter performs convolutional calculations with traversing the input data of the convolutional layers. At this time, the filter may be called a kernel. The Feature Map is a matrix created by convolution calculation. The Activation Map is a result of applying an activation function to the Feature Map matrix. The Tensor is a term used in Google's TensorFlow software platform.

Step (S120): Next, the bounding boxes are displayed on CCTV screen, and then are utilized in subsequent processes, for example, object tracking, unusual situation detection, etc. In FIG. 1 (*b*), the boundary boxes are shown in black on CCTV screen.

In this way, a technology of detecting objects in a video, e.g. a CCTV video, is used. However, in the conventional video analysis system, all the detected objects or all objects larger than a certain size are used in the image analysis. For example, all of these objects are considered in tracking objects, classifying objects, or identifying suspicious objects. As all objects are considered in the image analysis as described above, the processing efficiency of the video analysis system is greatly reduced.

SUMMARY OF THE INVENTION

It is an object of the present invention to provide a technology of detecting a stationary object in a static video such as a CCTV video.

In particular, an object of the present invention is to provide a technology of identifying a stationary object by use of inference information (Tensor, Activation Map) of Deep Learning object detector among objects which have been detected in a static video such as a CCTV video.

In order to achieve the above object, the method of detecting a stationary object by use of inference information of Deep Learning object detector according to the present invention comprises: obtaining inference result from the inference of Deep Learning object detector on the static video for each of a plurality of predetermined scales, wherein the inference result has the form of a predetermined multidimensional array which corresponds to a plurality of predetermined channel configuration; temporarily storing the inference results in a buffer during a predetermined frame period; calculating an average inference value for each of the plurality of scales by performing an average operation for each of the plurality of scales on attribute values of the plurality of inference results which are temporarily stored in the buffer, wherein the attribute values correspond to probability of object; acquiring data of one or more bounding boxes from the static video by performing bounding box decoding on the inference result of Deep Learning object detector; obtaining a stationary score for each of the bounding boxes by comparing the one or more bounding boxes obtained by the bounding box decoding with the average inference value calculated for each of the plurality of frames; and setting a bounding box having the stationary score greater than a predetermined threshold value as a stationary object.

The computer program according to the present invention is stored in a medium in order to execute a method for detecting a stationary object by use of inference information of Deep Learning object detector which has been set forth above by being combined with hardware.

BRIEF DESCRIPTION OF THE DRAWINGS

FIG. 9 is a diagram showing an example of a program code for executing a process of detecting a stationary object in the present invention.

DESCRIPTION OF SPECIFIC EMBODIMENTS

Hereinafter, the present invention will be described in detail with reference to the drawings.

Figure 3:
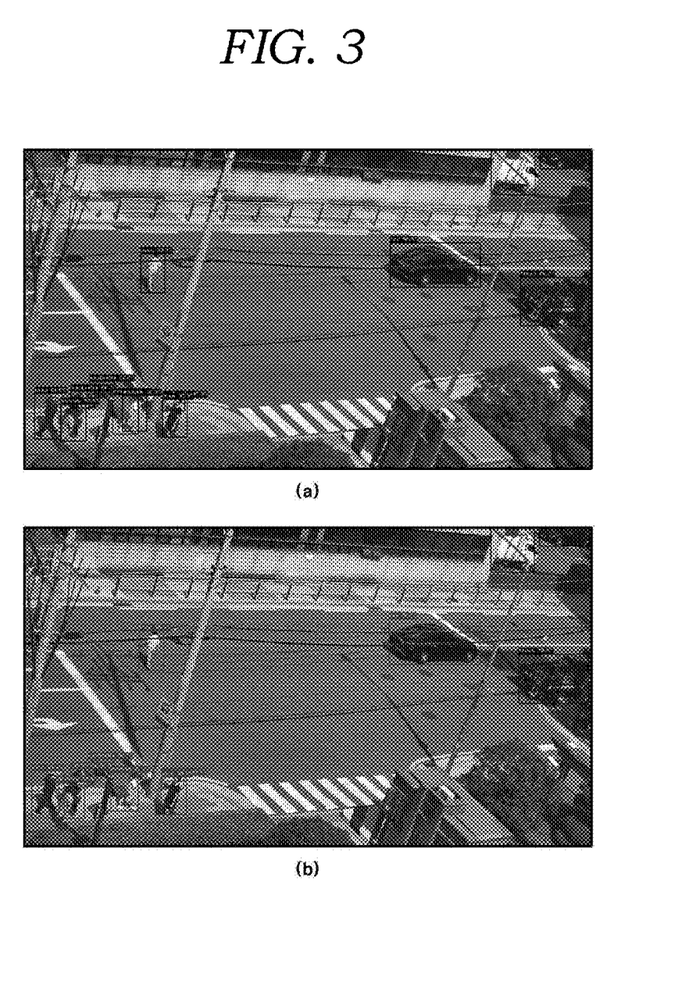
FIG. 3 is a diagram showing object detection results of the conventional art and the present invention.

FIG. 3 is a diagram showing object detection results of the conventional art and the present invention.

FIG. 3 (*a*) shows an example of the object detection result of the conventional art, in which the object detection was performed on a CCTV video and then 13 objects were detected and marked as bounding boxes. As such, the conventional video analysis system detects all the visually-identified objects in CCTV video and then utilizes them for post-processing (e.g., object tracking, object classification, suspicious object identification, etc.). Accordingly, in the case shown in FIG. 3 (*a*), post-processing such as object tracking, object classification, and suspicious object identification is performed for the 13 objects.

However, this scheme is inefficient. When considering the purpose of CCTV recording, the 13 objects do not have the same priority. Among the 13 objects, three objects in stationary state have low priority, and ten objects in running or walking state have relatively high priority. The conventional art handles all objects as analysis targets in analyzing CCTV video without focusing on some objects of relatively high priority (e.g., moving people, vehicles), by which computing resources are wasted and the advancement of image processing is hindered.

Accordingly, in FIG. 3 (*b*) showing the object detection result of the present invention, out of the 13 objects which have been detected in the CCTV video, three objects in stationary state (i.e., stationary objects) are marked as black boundary boxes, whereas ten objects in moving state (i.e., moving objects) are marked as red bounding boxes.

In the present invention, not only objects are detected from CCTV video, but also objects in stationary state are identified among the detected objects. The stationary objects are excluded from post-processing (e.g., object tracking, object classification, suspicious object identification, etc.), by which computing resources are focused on the moving objects.

The present invention may distinguish and identify stationary objects by using a series of inference information (Inference Tensor, Activation Map) which Deep Learning object detector outputs as an inference result, wherein the Deep Learning object detector has been trained with convolutional neural network (CNN). Meanwhile, in implementing the present invention, the solution (application) for configuring the Deep Learning object detector may be appropriately chosen by the system designer. For example, the solution may include TensorFlow, PyTorch, Keras, and Theano.

Figure 4:
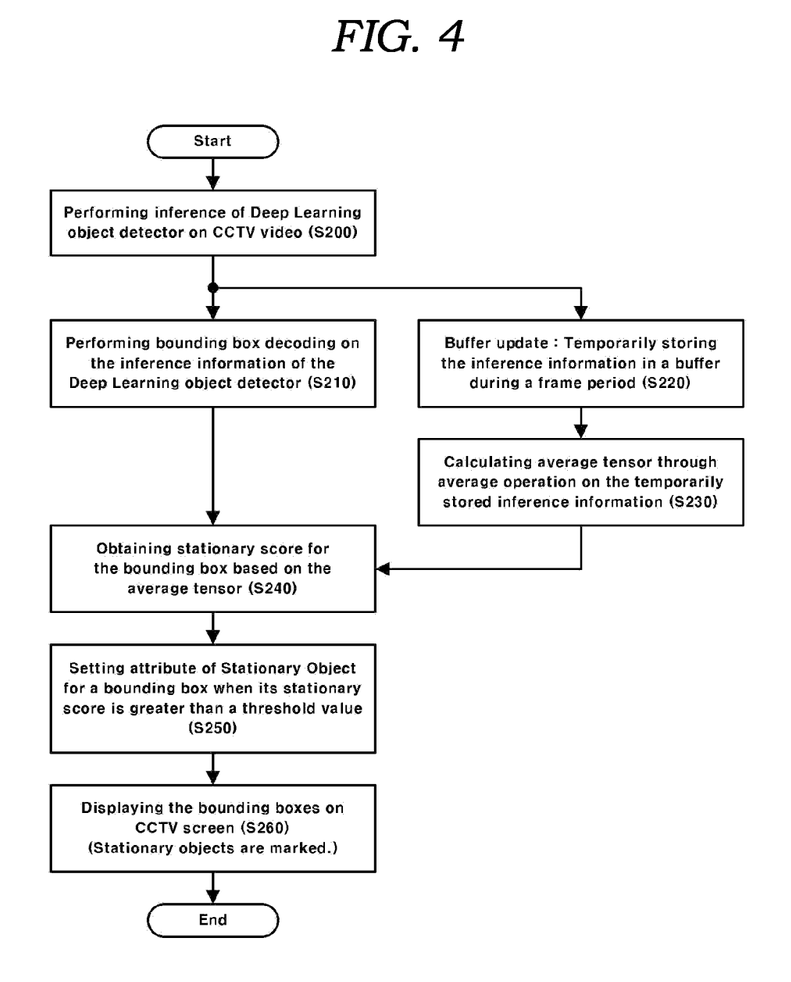
FIG. 4 is a flow chart showing a method of detecting a stationary object by use of inference information of Deep Learning object detector according to the present invention.

FIG. 4 is a flow chart showing a method of detecting a stationary object by use of inference information of Deep Learning object detector according to the present invention. The stationary object detection method according to the present invention may be performed by a computer hardware device such as an image analysis server in an video analysis system which handles CCTV video.

Step (S200): First, the inference of a Deep Learning object detector (e.g., YOLO) is performed on a static video, i.e., a video which is generated by a camera with a fixed view, such as a CCTV video. This process may be configured in the same manner as described above in (S100) of FIG. 2.

Step (S210): Boundary box decoding is performed on the inference information (Inference Tensor, Feature Map, Activation Map) which is calculated by the Deep Learning object detector. This process may be configured in the same manner as described above in (S110) of FIG. 2.

The boundary box decoding is a process of decoding the information on the bounding boxes which have been obtained by the object detector through memory access to Tensor of inference result of the object detector. The format of the Tensor of inference result may vary according to design and type of the object detector. The boundary box decoding is a process of accessing a pixel for each channel to derive the data of actual bounding boxes based on the information of each channel.

Figure 5:
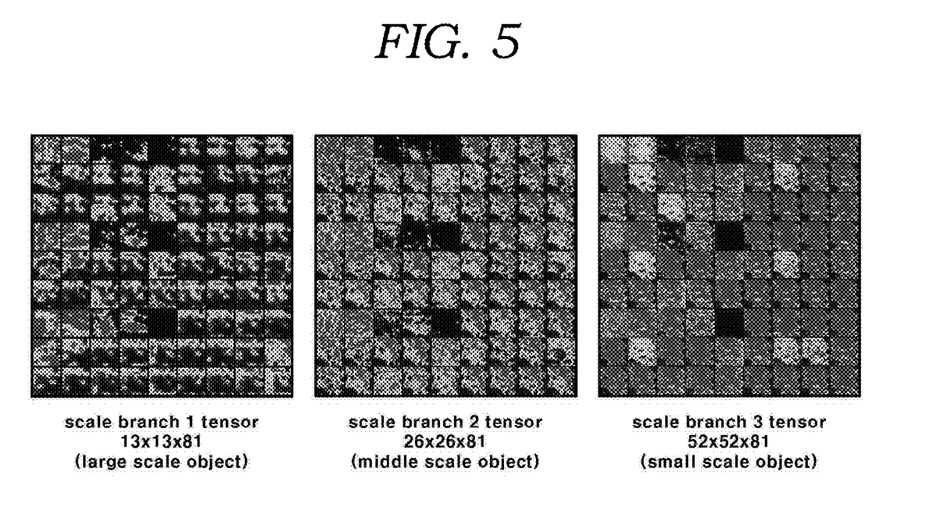
FIG. 5 is a diagram showing an example of visualization of Inference Tensors which have been calculated by Deep Learning object detector in the present invention.

FIG. 5 shows an example of visualization of Inference Tensors which have been calculated by an anchor-based detector model, which is commonly used as Deep Learning object detector trained with a convolutional neural network. In FIG. 5, there exist a total of 81 channels, i.e., (5+the number of classes (22))*the number of anchors (3)=81. The inference result (Inference Tensor) is classified according to the size and resolution of the bounding boxes to be trained according to the structure of the Deep Learning object detector. The inference result (Inference Tensor) is usually composed of 3-4 resolutions and 3 anchors. FIG. 5 shows the result images of the Inference Tensor which are output according to the various scales of the deep learning network. Specifically, FIG. 5 shows Tensors (scale branch 1-3 tensors) for channels and resolutions of a 13×13×81 large scale object, a 26×26×81 middle scale object, and a 52×52×81 small scale object.

In general, the Tensors of the Deep Learning object classifier are formatted as multi-dimensional arrays. By analyzing the Inference Tensor as shown in FIG. 5, it can be obtained the coordinate (x, y) of the bounding boxes, the width (w) and height (h) of the bounding boxes, Objectness Scores for object identification, and probability channels for each class.

Step (S220): Meanwhile, the inference information (Inference Tensor, Feature Map, Activation Map) which is calculated by the Deep Learning object detector is temporarily stored in a buffer for a predetermined frame interval (N frames). In this specification, the inference information will be described based on a Tensor.

In order to store the inference information in the previous frame, N Inference Tensors are temporarily stored in a buffer (i.e., tensor buffer) which operates in queue type, that is, a First-In First-Out type. The buffer size (N) may be adjusted according to the GPU memory specification of the inference hardware or the number of past frames to be considered.

Figure 6:
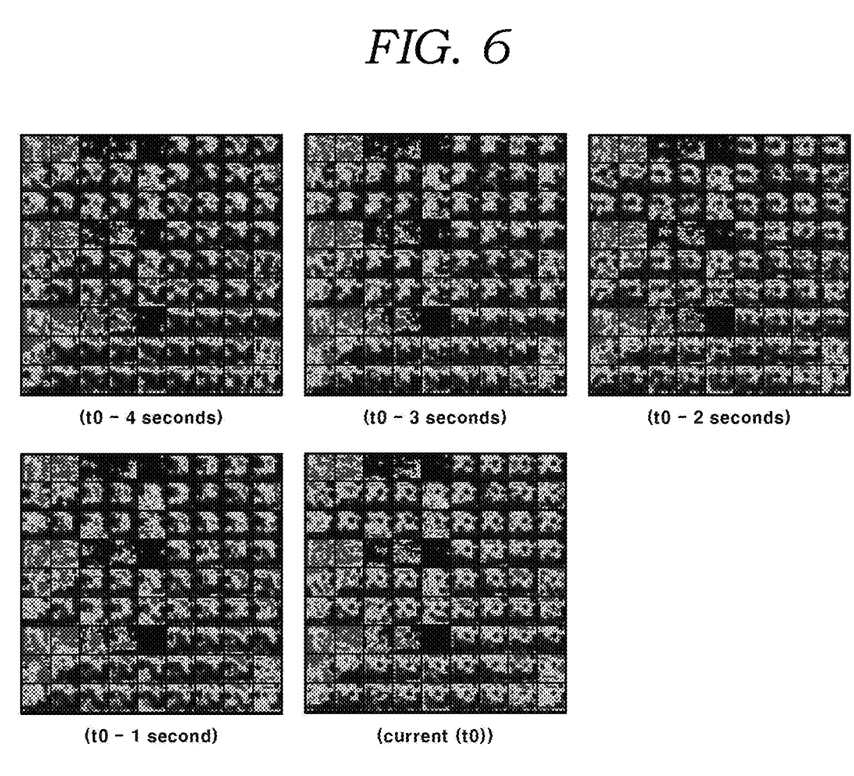
FIG. 6 is a diagram for visualizing the concept of buffering a plurality of Inference Tensors in the present invention.

FIG. 6 is a diagram for visualizing the concept of buffering a plurality of Inference Tensors in the present invention. FIG. 5 shows three scales (large scale object, middle scale object, small scale object). However, FIG. 6 only shows scale branch 1 tensor for a 13×13×81 large scale object for convenience. In FIG. 6, five Tensors are stored in a buffer at 1 second intervals. The time interval to store the tensor in the buffer may be appropriately chosen. For strict analysis, the Inference Tensor may be stored every frame (e.g., 1/30 second). On the other hand, for reducing the amount of computation, the Inference Tensor may be stored at regular frame intervals. In FIG. 6, the Inference Tensors have been stored at 1 second intervals.

Steps (S230, S240): Average tensor (i.e., average value of the inference values) is calculated through the average operation on the above temporarily stored N inference information. Then, a stationary score is calculated based on this average tensor. The score value obtained from the average tensor may be set as the stationary score as it is. Alternatively, the score value after an operation such as weight adjustment may be set as the stationary score.

The basic idea of detecting stationary objects in the present invention is to calculate the average of the Objectness Scores which have been generated in the inference process of the Deep Learning object detector, and then to find singular points which have unusually high values.

The Objectness Score is a value between 0 and 1 which represents the probability of an object. In the average operation, Objectness Scores of stationary objects will be added N times (e.g., 5 times), whereas Objectness Scores of moving objects will be added only a small number of times (e.g., 1 or 2 times). After performing the addition and then division by N, the Objectness Scores of the stationary objects will be almost the same as the original, whereas the Objectness Scores of the moving objects will go down to very small values. That is, when the average operation is performed on the inference information over certain frames, the result value will be different between stationary objects and moving objects.

Various types of average operation are possible. A simple arithmetic-averaging or a weighted-averaging may be performed. Alternatively, after deleting the smallest and the largest values, the average can be calculated using only the remaining values.

In addition, the average may be calculated with letting the Objectness Scores as they are. Alternatively, the average may be calculated after applying a reinforcement operation, such as a square operation or a binarization operation, on the Objectness Scores. In the case of the square operation, for example, when the Objectness Score between 0 and 1 is squared, the result approaches 0. Therefore, the Objectness Scores of the moving objects will become much smaller by the average operation.

Therefore, by this average operation, the areas including stationary objects become prominent.

When S230 is expressed as a mathematical pseudo-code, it will be [Equation 1] to [Equation 4]. First, [Equation 1] shows a process of obtaining an Objectness Score for inference information of a Deep Learning object detector.

$$y = \text{detector model}(x) \quad \text{[Equation 1]}$$

Next, [Equation 2] and [Equation 3] show two examples of applying the reinforcement operation to the Objectness Score. [Equation 2] shows an example of applying a square operation, and [Equation 3] shows an example of applying a binarization operation. [Equation 2] is suitable for the case where the learning result of the convolutional neural network of the Deep Learning object detector is stable. [Equation 3] is suitable for the case where the Objectness Score is low in the inference result of the Deep Learning object detector, so that the Score value may be emphasized through the binarization.

$$z = y^2 \quad \text{[Equation 2]}$$

$$z = \begin{cases} 1, & \text{if } y > 0.25 \\ 0, & \text{otherwise} \end{cases} \quad \text{[Equation 3]}$$

Next, [Equation 4] shows a process of obtaining the arithmetic average. When the average operation is completed by [Equation 4], if an object exists in the bounding box of each pixel, a numerical value may be obtained, in which the numerical value indicates whether the object is in stationary state. In this specification, this numerical value is referred to as stationary score.

$$\text{stationary score} = \frac{1}{n} \sum_{i=1}^{n} z_i \quad \text{[Equation 4]}$$

Figure 7:
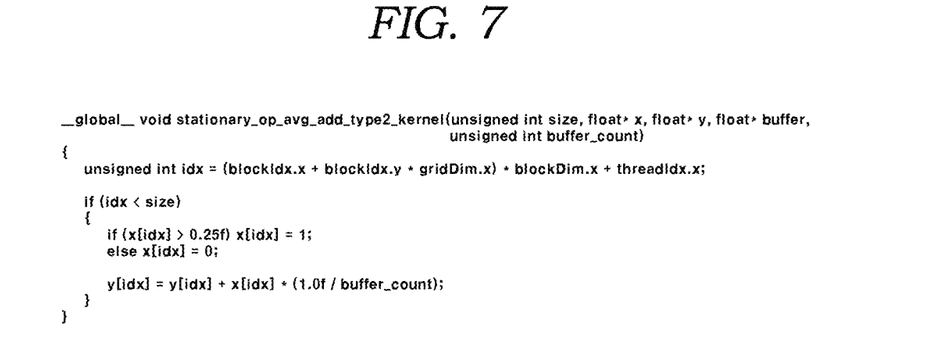
FIG. 7 is a diagram showing an example of a program code that executes a process of calculating an average tensor in the present invention.
Figure 8:
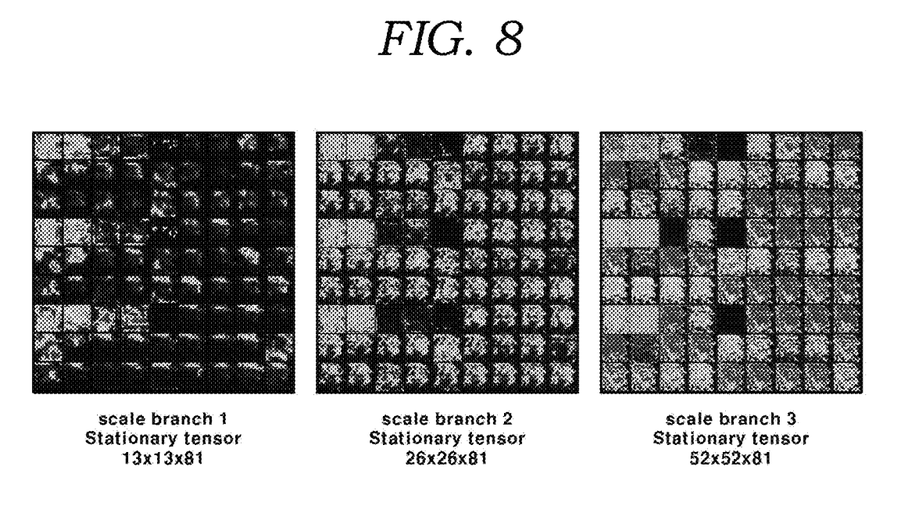
FIG. 8 is a diagram showing an example of visualization of average tensors in the present invention.

The average operation for the entire Tensors which are generated by a Deep Learning object detector for a CCTV video may be executed in parallel in a Graphics Processing Unit (GPU) by a kernel, as shown in the program code of FIG. 7. The reinforcement operation of [Equation 3] is applied to the program code of FIG. 7. The kernel executes iteratively for N Tensors to accumulate the average result on y. FIG. 8 visualizes the average tensor y which may be obtained by applying the average operation of the program code of FIG. 7 to five Inference Tensors which are temporarily stored in the buffer as shown in FIG. 6.

Like FIG. 5, FIG. 8 also shows average tensors which are obtained according to the various scales of the deep learning network. Specifically, the average tensors (scale branch 1-3 Stationary tensors) for channels and resolutions of a 13×13×81 large scale object, a 26×26×81 middle scale object, and a 52×52×81 small scale object.

In S240, the boundary box decoding is performed with integrating the information detected in S210 and S230. In S210 and S230, memory access and decoding processes are performed on output tensors which are generated (inferred) in parallel by GPU operations, respectively, and index values are calculated at the pixel positions of each Tensor. After that, bounding boxes are generated by collecting significant information for each channel. Then, the stationary score is calculated for the bounding boxes.

FIG. 9 is a program source code for implementing the above process, and is executed for each anchor. In FIG. 9, the memory access and utilization of the average tensor has been added in order to reflect the stationary score which was generated in S240 for the bounding box decoder of the general anchor-based object detector used in S210.

Steps (S250, S260): When the stationary score which is obtained in S240 is greater than a predetermined threshold, an attribute of Stationary Object is set for the bounding box. Then, when displaying the bounding boxes on the CCTV screen, the stationary objects are distinguishably displayed. Referring to FIG. 3 (b), among a total of 13 objects detected in a CCTV video, three (3) objects which are detected as stationary objects by the stationary score are displayed as black bounding boxes. The remaining ten (10) objects are displayed as red bounding boxes.

Figure 10:
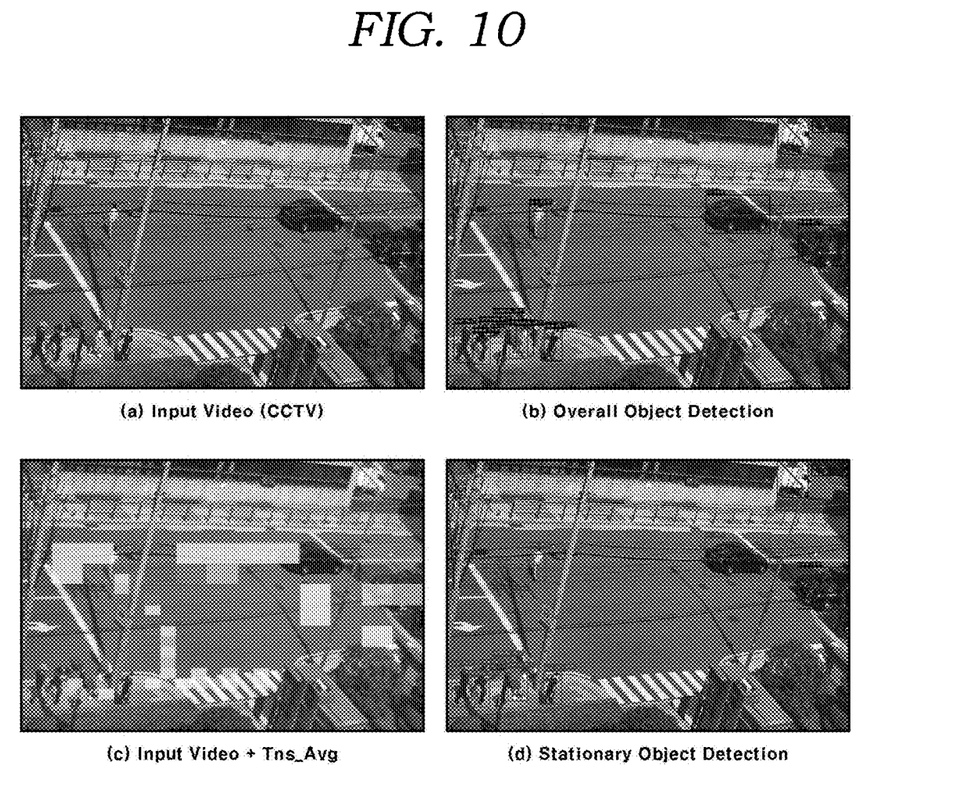
FIG. 10 is a diagram showing CCTV videos and visualization of average tensors in order to describe the process of detecting a stationary object of a static video according to the present invention.
Figure 11:
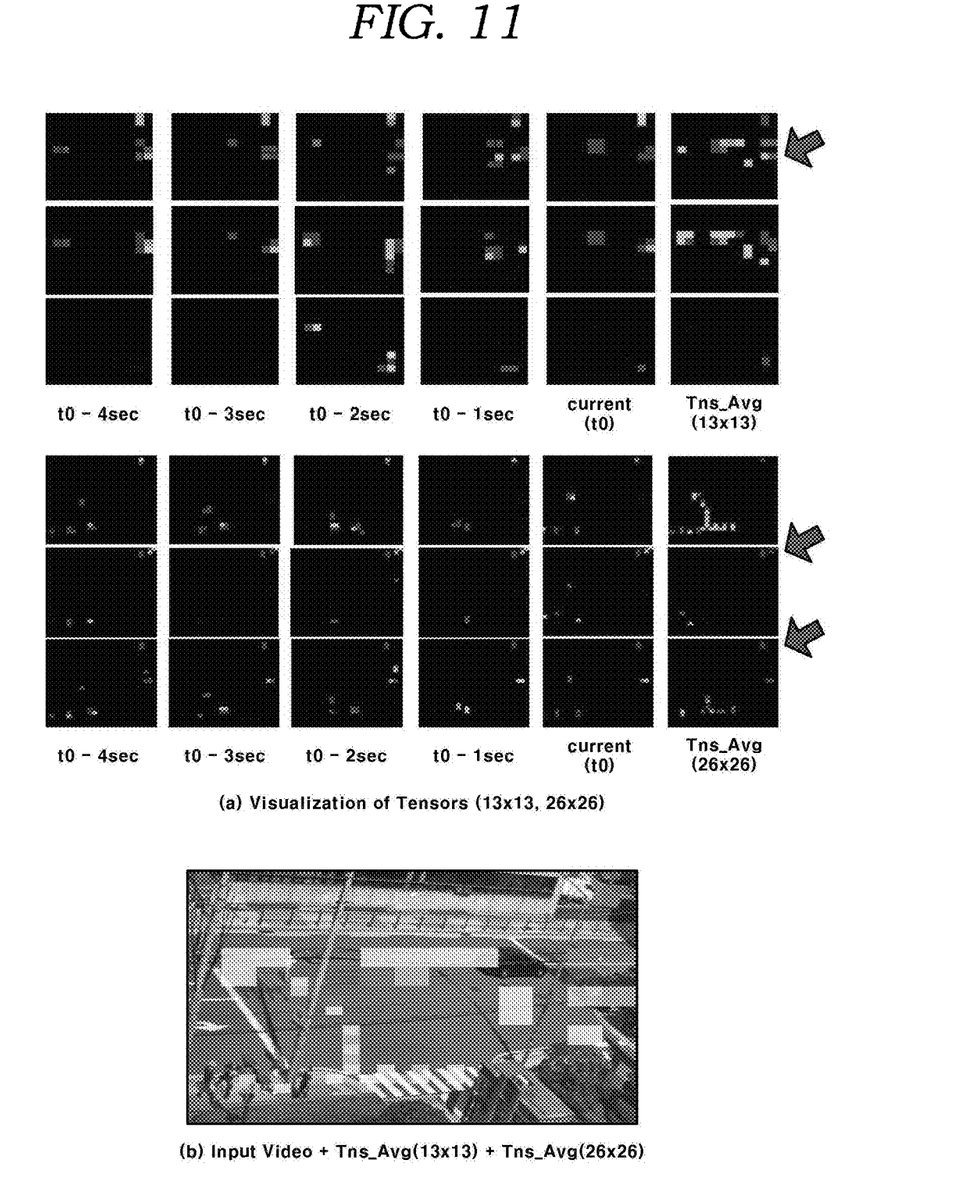
FIG. 11 is a diagram showing visualization of Inference Tensors and average tensors in order to describe the process of detecting a stationary object of a static video according to the present invention.

FIG. 10 is a diagram showing CCTV videos and the visualization of average tensors in order to describe the process of detecting a stationary object of a static video according to the present invention. FIG. 11 is a diagram showing visualization of Inference Tensors and average tensors in order to describe the process of detecting a stationary object of a static video according to the present invention.

FIG. 10 (a) shows a CCTV video, and FIG. 10 (b) shows the result of detecting all objects for this CCTV video. Referring to FIG. 10 (b), 13 objects have been detected in the CCTV video, all of which are marked by black bounding boxes.

FIG. 10 (c) shows the average tensor (Tns_Avg) being overlaid on the CCTV video, in which the average tensor (Tns_Avg) is obtained by applying the stationary object detection process of the present invention to this CCTV video. Among the 13 objects of FIG. 10 (b), the regions having a high stationariness (static tendency) are displayed in red colors because their average tensor values are high.

By combining the object detection result of all objects shown in FIG. 10 (b) and the average tensor value shown in FIG. 10 (c), the object detection result as shown in FIG. 10 (d) may be obtained in which stationary objects are identified. Among 13 boundary boxes, three boundary boxes with a high average tensor are marked in black (stationary object), and the remaining 10 boundary boxes are displayed in red, by which stationary objects and moving objects are distinguished.

FIG. 11 (a) visualizes five Inference Tensors (t0-4 seconds~current t0) and the average tensor (Tns_Avg), in which the Inference Tensors are obtained by the Deep Learning object detector for the input video of FIG. 10 (a) and temporarily stored over time, and in which the average tensor (Tns_Avg) is obtained by performing average operation on the five Inference Tensors. FIG. 5 and FIG. 8 presented three scales (large scale object, middle scale object, and small scale object). However, FIG. 11 (a) presents only 13×13 large scale resolution and 26×26 middle scale resolution. The closer it is to the red color, the higher the stationariness (stationary tendency). Areas without objects are shown in black because there is no Objectness Score value. And, areas without motion are shown in red because the average tensor value is high.

FIG. 11 (b) shows the average tensor (Tns_Avg) of the 13×13 large scale resolution and the average tensor (Tns_Avg) of the 26×26 middle scale resolution shown in FIG. 11 (a) being overlaid on the input video (CCTV video) shown in FIG. 10 (a). When three RGB images for each of the two resolutions in FIG. 11 (a) are combined and then overlaid on the input video (CCTV video), the average tensors are low in the image areas of moving objects among the objects detected in the CCTV video.

According to the present invention, it is possible to lower the priority of stationary objects in processing a static video, such as a CCTV video, so that computing resource of the video analysis system can be effectively utilized to enhance the performance of image analysis.

Meanwhile, the present invention can be implemented in the form of a computer-readable code on a non-transitory computer-readable medium. Various types of storage devices exist as the non-transitory computer-readable medium, such as hard disks, SSDs, CD-ROMs, NAS, magnetic tapes, web disks, and cloud disks. The codes may be distributed, stored, and executed in multiple storage devices which are connected through a network. Further, the present invention may be implemented in the form of a computer program stored in a medium in order to execute a specific procedure by being combined with hardware.

What is claimed is:

1. A method of detecting a stationary object from a static video, defined as a video generated by a camara with a fixed view, by a computer hardware device by use of inference information of Deep Learning object detector, the method comprising:

obtaining inference result from the inference of Deep Learning object detector on the static video for each of a plurality of predetermined scales, wherein the inference result has the form of a predetermined multidimensional array which corresponds to a plurality of predetermined channel configuration;

temporarily storing the inference results in a buffer during a predetermined frame period;

calculating an average inference value for each of the plurality of scales by performing an average operation for each of the plurality of scales on attribute values of the plurality of inference results which are temporarily stored in the buffer, wherein the attribute values correspond to probability of object;

acquiring data of one or more bounding boxes from the static video by performing bounding box decoding on the inference result of Deep Learning object detector;

obtaining a stationary score for each of the bounding boxes by comparing the one or more bounding boxes obtained by the bounding box decoding with the average inference value calculated for each of the plurality of frames;

setting a bounding box having the stationary score greater than a predetermined threshold value as a stationary object;

wherein the calculating an average inference value comprises:

obtaining Objectness Scores from the inference results, wherein the Objectness Scores are attribute values corresponding to the probability of object; and arithmetic-averaging the Objectness Scores so as to obtain an average inference value; and wherein the calculating an average inference value further comprises reinforcing the stationariness by performing a predetermined reinforcement operation on the Objectness Scores.

2. The method of claim 1, wherein the reinforcement operation is square operation for the Objectness Scores.

3. The method of claim 1, wherein the reinforcement operation is binarization operation for the Objectness Scores.

4. A non-transitory computer program contained in a non-transitory storage medium comprising program code instructions which executes a method of detecting a stationary object from a static video, defined as a video generated by a camara with a fixed view, by a computer hardware device by use of inference information of Deep Learning object detector, the method comprising:
  obtaining inference result from the inference of Deep Learning object detector on the static video for each of a plurality of predetermined scales, wherein the inference result has the form of a predetermined multidimensional array which corresponds to a plurality of predetermined channel configuration;
  temporarily storing the inference results in a buffer during a predetermined frame period;
  calculating an average inference value for each of the plurality of scales by performing an average operation for each of the plurality of scales on attribute values of the plurality of inference results which are temporarily stored in the buffer, wherein the attribute values correspond to probability of object;
  acquiring data of one or more bounding boxes from the static video by performing bounding box decoding on the inference result of Deep Learning object detector;
  obtaining a stationary score for each of the bounding boxes by comparing the one or more bounding boxes obtained by the bounding box decoding with the average inference value calculated for each of the plurality of frames; and
  setting a bounding box having the stationary score greater than a predetermined threshold value as a stationary object;
  wherein the calculating an average inference value comprises:
  obtaining Objectness Scores from the inference results, wherein the Objectness Scores are attribute values corresponding to the probability of object; and
  arithmetic-averaging the Objectness Scores so as to obtain an average inference value; and
  wherein the calculating an average inference value further comprises reinforcing the stationariness by performing a predetermined reinforcement operation on the Objectness Scores.

5. The non-transitory computer program of claim 4, wherein the calculating an average inference value comprises:
  obtaining Objectness Scores from the inference results, wherein the Objectness Scores are attribute values corresponding to the probability of object; and
  arithmetic-averaging the Objectness Scores to obtain an average inference value.

* * * * *